July 25, 1944.  R. C. BRIANT  2,354,426

METHOD OF MAKING COMPOSITE ARTICLES

Filed Oct. 17, 1940

INVENTOR
Raymond C. Briant
BY
ATTORNEYS

Patented July 25, 1944

2,354,426

UNITED STATES PATENT OFFICE 2,354,426

METHOD OF MAKING COMPOSITE ARTICLES

Raymond C. Briant, Pittsburgh, Pa., assignor to The Firestone Tire & Rubber Company, Akron, Ohio, a corporation of Ohio Application October 17, 1940, Serial No. 361,594

3 Claims. (Cl. 117—76)

This invention relates to the art of making composite articles, and more especially it relates to an improved method of making composite articles from a vulcanizable rubber-like substance and cellulosic fabric.

The natural adhesion of cotton to rubber is fairly good when the rubber is vulcanized in pressure contact with the cotton. For this reason it has been standard practice in the rubber industry to form the plies of pneumatic tires and similar fabric reinforced rubber articles by merely calendering a vulcanizable rubber composition and cotton fabric together. The plies were then assembled, with or without other vulcanizable rubber elements, and the composite article so produced was vulcanized under pressure.

Although a tire produced by this standard practice was formerly satisfactory for most uses, such a tire cannot always be relied upon to stand up at the high speeds and under the heavy loads now commonly utilized by many private and commercial automobile operators. Many blowouts and other tire failures have recently characterized the use of such tires, thus demonstrating the fact that the body strength of the tires was insufficient. By body strength is meant the resistance of a tire to the separation of fabric from rubber in the plies due to flexing and to the rupture of the tire structure due to impact with stones, etc., on the road. The body strength of a tire depends on the strength of the fabric cords and of the rubber compound in and around the cords, but it also depends on the adhesion between the rubber compound and the fabric.

Slight improvements in the adhesion of the rubber to cotton fabric have been obtained by first impregnating the fabric with a rubber cement or a latex composition and drying the impregnated fabric before calendering the same with rubber as by the prior method. However, these improvements have left much to be desired, and there have been many serious attempts in recent years to improve the body strength of tires by substituting high tenacity rayon cord for the conventional cotton tire cord, making use of special adhesives to improve the naturally poor adhesion of the rayon to the rubber. Certain of these adhesives have been ineffective in improving the adhesion of rayon to rubber to a point beyond that previously obtained between bare cotton cord and rubber. Other adhesives have appeared to produce satisfactory adhesion at ordinary temperatures, but have failed to maintain high adhesion at the higher temperatures prevailing in high speed tires when in service.

The present invention provides a method of improving the adhesion of rubber to a cellulosic fabric such as rayon or cotton fabric, both at low temperatures and high temperatures. By the operation of the new method vulcanized rubber-fabric articles are produced having improved body strengths, and therefore longer service lives.

A primary object of the present invention is to provide a method of improving the adhesion of a rubber-like substance to cellulosic fabric.

Another object is to provide a method of bonding rubber to cellulosic fabric to obtain improved adhesion therebetween at both low and high temperatures.

Another object is to provide a method of making an improved composite rubber-fabric article, such as a tire, having an improved body strength.

The above and further objects will be manifest from the following description of the invention and the accompanying drawing, in which.

Figure 1:
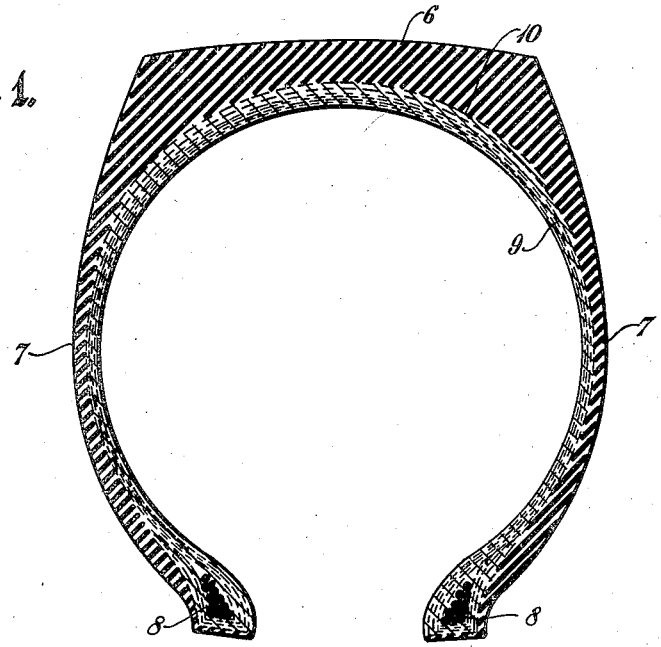
Figure 1 is a cross-sectional view of a pneumatic tire produced according to the present invention.

Broadly, the invention comprises impregnating cellulosic fabric with an aqueous dispersion of a rubber-like substance including a special type of water soluble resin. The resin contemplated by the invention is formed by condensing a water soluble aldehyde and a monohydric phenol in the presence of an alkali. The impregnated fabric is then dried and heated at a temperature above 100° C. for a time sufficient to produce substantially maximum adhesion between the rubber-like substance and fabric in the finished article. The heat-treated fabric is then placed in contact with the vulcanizable composition of the same rubber-like substance and the mass is vulcanized, preferably under pressure, in the usual manner to produce the finished composite article.

Throughout the specification and claims "cellulosic fabric" is meant to include threads, filaments, cords, woven fabric, and creel fabric made up substantially of cotton, rayon, or the like. A rubber is meant to include natural rubber as well as other vulcanizable rubbery substances, such as neoprene, diolefin polymerizates and copolymers, and reclaimed rubber.

The special resin contributing to the success of the present invention is prepared by the alkaline condensation of a water soluble aldehyde and a monohydric phenol having ortho and para positions unsubstituted. Preferably phenol, meta cresol, or symmetrical xylenol is used. Formaldehyde is the preferred aldehyde although other aldehydes having similar properties may be used, such as acetaldehyde, propionaldehyde, furfuraldehyde, etc. The condensation is conducted in such a manner that the resin is always maintained in a water soluble condition. This result may be conveniently accomplished by the use of about 10% of sodium hydroxide (or an equivalent amount of some other alkali) on the weight of the phenol employed and by keeping the concentration of reactants relatively high during the heating period of the condensation reaction. Preferably, the resin solution should have a final viscosity of at least 2½ poises. The resin solution may be successfully utilized even though it is gelled, if the gel can be readily broken up and dispersed in water.

The adhesive composition utilized in the present invention is made up by mixing a portion of the finished resin solution with an alkaline preserved latex composition in proportions such that the ratio of phenol entering into the resin to the dry rubber content of the adhesive composition is less than 1:1 (that is, the adhesive composition contains more rubber than resin, as measured by the phenol used in making the resin) and preferably in the range of 1:6 to 1:12. The aqueous dispersion of the rubberlike substance may be a latex, natural or synthetic, and may contain reinforcing pigments and vulcanizing ingredients if desired. The concentration of the dry rubber in the final adhesive (latex-resin cement) may vary within wide limits, depending on the type of impregnation used and other factors; for ordinary impregnation of fabric by dipping in an aqueous rubber dispersion the dry rubber content is preferably in the range of about 8% to 20%.

It has also been found that the addition of a special surfaceactive substance, "Aresklene" (the sodium salt of the reaction product of ortho hydroxy diphenyl, n-butyl alcohol and sulfuric acid; U. S. Patent No. 2,135,978), in a concentration of about 0.25 per cent to 1.50 per cent, to the latex-resin cement substantially improves the value of the new process when applied to cotton fabric, higher adhesions being consistently obtained. Other similar wetting agents such as "Aquarex F" (sodium salt of isopropylnaphthalene sulfonic acid), likewise effect appreciable improvements in rubber-cotton adhesion when they are similarly used in the present process.

The impregnated fabric is preferably dried, or heated after drying, in a special manner in order to bring about the high adhesions to rubber contemplated by the present invention. Preferably, the impregnated fabric is heated at a temperature above 100° C. for a substantial length of time after the fabric is dry, in order to produce substantially the maximum adhesion value possible. Practically speaking, the time of heat treating must be in excess of about one hour. A preferred treatment consists in heating the impregnated fabric for one to three hours at a temperature approximating 130° C.

The following example is given for illustrative purposes only and is not to be construed as limiting the invention thereto.

EXAMPLE

A resin solution for use in the present method is made by heating a mixture of 1 part of phenol, 2.08 parts of commercial formalin and 1 part of 10 per cent sodium hydroxide until the mass thickens. Water is then added to thin the mass until it can be boiled without charring at the bottom of the container. The heating is continued until dilution is again necessary. This gradual dilution while heating is continued until the reaction mass obtains a weight of 12.5 parts and the viscosity of the solution has risen to at least 2½ poises.

The latex-resin cement is made by mixing 24.5 parts of the resin solution just described with 75.5 parts of a cement, the formula of which is shown in the following Table 1:

TABLE 1

| | Per cent |
|---|---|
| Latex (60% rubber) | 39.70 |
| Aqueous 50% sulfur dispersion | 1.67 |
| Aqueous 40% zinc oxide dispersion | 1.55 |
| Accelerator | 0.12 |
| Sodium hydroxide | 0.28 |
| Water | 56.68 |

The ratio of the phenol used in the resin to the dry rubber in the cement is approximately 1:9.1.

Figure 2:
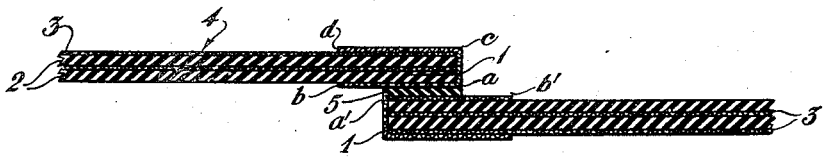
Figure 2 is an enlarged cross-sectional view of an unvulcanized assemblage of rubber and fabric, a portion of the fabric being treated according to the present invention to provide test pieces.
Figure 3:
Figure 3 is an enlarged cross-sectional view of a vulcanized composite article produced by heating the assemblage including the test pieces represented in Figure 2 in a suitable mold.

The latex-resin cement may be used in the present method according to an adhesion test procedure, useful in evaluating the invention. The test procedure will be described with reference to Figures 2 and 3 of the drawing, which show the arrangement of the elements of a test block, before and after vulcanization of the block.

A cross woven cotton fabric of the type commonly employed in various portions of pneumatic tires and other reinforced rubber articles is impregnated with the latex cement or latex-resin cement by dipping, spraying or in any other suitable known manner. One portion of the impregnated fabric is completely air dried at room temperature and another portion is dried by heating it for two hours at 130° C. in an oven. Strips one inch in width are cut from the dried impregnated fabric, and adhesion test pieces I, suitably about one inch square, are cut from the strips.

A conventional rubber gum stock 2 is calendered on to cotton duck 3 to produce rubberized fabric having a thickness of 0.080 inch. Two pieces of this fabric, 1 inch by 3 inches, are placed together to form a two-ply slab 4. A fabric test piece I is then placed around one end of a slab 4 in the manner shown in Figure 2, each of the distances a—b and c—d being greater than ¼ inch. Two slabs with a test piece I on one end of each are assembled with a small, thin piece 5 of a conventional ply stock (¼ inch by 1 inch) to form the assembled test block shown in Figure 2. The two slabs are assembled with the gum stock 5 between portions a—b and a'—b' of the test pieces, so that the overlap of the slabs is ¼ inch. The assembled test block is then placed in a suitable mold and vulcanized by the application of heat and pressure to produce the completed block shown in Figure 3.

The adhesion between the fabric test pieces 1 and the rubber 5 is obtained by placing the vulcanized block in a conventional Scott tensile testing machine and measuring the force required to pull one slab of the test block from the other. The adhesion values obtained at room temperature on fabric impregnated with the latex-resin cement are set forth in pounds per square inch in Table 2, together with comparable adhesion values of fabric impregnated with the latex cement shown in Table 1, which contains no resin. Varying amounts of Aresklene were employed in the impregnating cements, as is indicated in Table 2.

TABLE 2

*Adhesion at room temperature*

| Heat treatment | Concentration of Aresklene | | | |
|---|---|---|---|---|
| | 0 | 0.40% | 0.75% | 1.00% |
| Latex cement: | | | | |
| Air dried | 241 | 261 | 254 | 261 |
| 2 hours at 130° C | 298 | 261 | 240 | 255 |
| Latex-resin cement: | | | | |
| Air dried | 317 | 278 | 339 | 232 |
| 2 hours at 130° C | 347 | 406 | 460 | 460 |

Thus it is seen that the addition of the resin to the latex cement and the heating of the fabric impregnated therewith produced considerably higher adhesion values than those of the fabric impregnated with conventional latex cement. The adhesion of rubber to bare cotton fabric, not impregnated with latex, has been found to be approximately 240 pounds per square inch when measured according to the above-described testing procedure.

In order to evaluate the improvements of the new process with respect to high service temperatures, adhesion values were also obtained at a temperature of 100° C. in an enclosed Scott tensile testing machine. The results, expressed in pounds per square inch, are given in Table 3:

TABLE 3

*Adhesion at 100° C.*

| Heat treatment | Concentration of Aresklene | | |
|---|---|---|---|
| | 0.40% | 0.75% | 1.00% |
| Latex cement: | | | |
| Air dried | 189 | 157 | 138 |
| 2 hours at 130° C | 132 | 152 | 153 |
| Latex-resin cement: | | | |
| Air dried | 178 | 186 | 177 |
| 2 hours at 130° C | 263 | 238 | 302 |

The adhesion of the fabric impregnated with the latex-resin cement and then heated is seen to remain considerably higher than that of fabric impregnated only with a conventional latex cement.

It has been found that other resin-rubber ratios less than 1:1 are operable in the present method, although cements containing a ratio of the phenol of the resin to the rubber in the cement in the range of 1:6 to 1:12 are preferable. Other tests have shown that substantially maximum adhesion results are obtained on heating the impregnated fabric for at least one hour at a temperature above 100° C. Further tests have shown that the method produces a substantially improved adhesion between rayon and rubber.

A water soluble resin formed by the alkaline condensation of phenol and formaldehyde has been shown hereinabove to be suitable for use in the present method of securing rubber to cellulosic fabric. It has also been determined that resins similarly produced by the condensation of m-cresol or symmetrical xylenol (3,5-dimethyl phenol) with a water-soluble aldehyde are satisfactory for incorporation in the latex-resin cement utilized according to the invention.

Although the invention has been described in connection with a cross woven fabric, it is obvious that the invention is not limited to securing improved adhesion between rubber and cross woven fabric, since the high adhesion is obtained between the rubber and the cellulosic fibers or filaments and is not substantially dependent on the type of fabric employed.

From the above description of the invention it is apparent that the new method is readily applicable to the production of improved tires. The method is applied to the manufacture of tires by first impregnating tire fabric with the latex-resin cement of the invention by dipping or other suitable known technique and then drying and heating the impregnated fabric at a temperature above 100° C. for a period of at least an hour; the drying and heating may be separate or concurrent operations. The treated fabric is thereafter calendered with a rubber composition to form the tire plies in the customary manner, and the tire is built and vulcanized as usual.

The improved tire is represented in section in Figure 1, the tire having a conventional tread 6, sidewalls 7 and beads 8. The body plies 9 and tread plies 10 of the tire are composed of suitable tire fabric which has been impregnated with a latex-resin cement, dried and heated according to the invention, and then united with an appropriate body stock rubber composition.

A tire produced according to the invention has an improved flexing life as shown by a greater resistance to the separation of fabric from rubber in the plies and an improved resistance to rupture by sharp impacts. Thus the new tire has an improved body strength by virtue of the increased adhesion of the rubber to the fabric in the body of the tire, which improved adhesion has been effected by means of the present invention. The new method is equally useful in the production of improved fan belts or other commercial rubber-fabric composite articles.

It is noteworthy that the present method adds little to the conventional cost of producing rubber-fabric articles, since the components used in making up the type of resin employed are very cheap and are readily available.

The invention is not limited to the specific example given above, but extends to the broader modifications thereof herein described and suggested. It is intended that the appended claims shall cover whatever features of patentable novelty reside in the invention.

What is claimed is:

1. A method of making a rubber-fabric composite article having improved adhesion between the rubber and fabric thereof, which comprises impregnating cotton fabric with a mixture of an aqueous rubber dispersion and a water soluble resin having a viscosity of at least 2.5 poises and formed by the alkaline condensation of a water soluble aldehyde and a monohydric phenol selected from the group consisting of phenol, meta cresol and symmetrical xylenol, the ratio of the resin as measured by the monohydric phenol content thereof to the rubber in said mixture being between 1:6 and 1:12, the said mixture containing between 0.25 per cent and 1.50 per cent of the sodium salt of the reaction product of ortho hydroxy diphenyl, n-butyl alcohol and sulfuric acid, drying the impregnated fabric, heating the dried fabric for at least one hour at a temperature above 100° C., the heating treating being equivalent to a heating treatment at 130° C. of from one to three hours, and thereafter heating the fabric in contact with a vulcanizable rubber composition to produce a composite vulcanized rubber-fabric article.

2. A method of making a rubber-fabric composite article having improved adhesion between the rubber and fabric thereof, which includes the steps of heating an aqueous solution of phenol, formaldehyde and sodium hydroxide to form an aqueous resin solution having a viscosity of at least 2.5 poises, mixing the resin solution with an aqueous rubber dispersion to form a latex-resin cement in which the ratio of the resin as measured by the phenol content thereof to the rubber in said cement is between 1:6 and 1:12, impregnating cellulosic fabric with said cement, drying the impregnated fabric, heating the dried fabric for about two hours at approximately 130° C., and then heating the fabric in contact with a vulcanizable rubber composition to produce a composite rubber-fabric article.

3. A method of making a rubber-fabric composite article having improved adhesion between the rubber and fabric thereof, which includes the steps of impregnating cellulosic fabric with a mixture of an aqueous dispersion of a rubber and a water soluble resin having a viscosity of at least 2.5 poises and formed by the alkaline condensation of a water soluble aldehyde and a monohydric phenol selected from the group consisting of phenol, meta cresol and symmetrical xylenol, the ratio of the resin as measured by the monohydric phenol content thereof to the rubber in said mixture being between 1:6 and 1:12, drying the impregnated fabric, heating the dried fabric for at least one hour at a temperature above 100° C., the heating treatment being equivalent to a heating treatment at 130° C. of from one to three hours, and thereafter heating the fabric in contact with a vulcanizable composition of said rubber to produce a composite article of cellulosic fabric and a vulcanized rubber.

RAYMOND C. BRIANT.